United States Patent [19]

Cassidy

[11] Patent Number: 4,740,053
[45] Date of Patent: Apr. 26, 1988

[54] SHEATHED OPTICAL FIBER CABLE

[75] Inventor: Stephen A. Cassidy, Ipswich, England

[73] Assignee: British Telecommunications plc, United Kingdom

[21] Appl. No.: 717,645

[22] Filed: Mar. 29, 1985

[30] Foreign Application Priority Data

Mar. 29, 1984 [GB] United Kingdom ................ 8408184
Jun. 4, 1984 [GB] United Kingdom ................ 8414208

[51] Int. Cl.⁴ .............................................. G02B 6/44
[52] U.S. Cl. .......................... 350/96.23; 350/96.30; 350/96.33
[58] Field of Search .............. 350/96.23, 96.29, 96.30, 350/96.31, 96.33; 174/705; 254/134.4

[56] References Cited

U.S. PATENT DOCUMENTS

| | | | |
|---|---|---|---|
| 4,082,423 | 4/1978 | Glista et al. ...................... | 350/96.23 |
| 4,105,284 | 8/1978 | Olshansky ......................... | 350/96.33 |
| 4,181,403 | 3/1980 | Macedo et al. . | |
| 4,185,809 | 1/1980 | Jonnes .............................. | 254/134.4 |
| 4,230,395 | 10/1980 | Dean et al. ....................... | 350/96.23 |
| 4,552,433 | 11/1985 | Titchmarsh et al. ............. | 350/96.23 |
| 4,659,174 | 4/1987 | Ditscheid et al. ................ | 350/96.23 |
| 4,691,896 | 9/1987 | Reeve et al. ...................... | 254/134.4 |

FOREIGN PATENT DOCUMENTS

| | | |
|---|---|---|
| EP108590-A | 2/1984 | European Pat. Off. . |
| 2507583 | 7/1976 | Fed. Rep. of Germany . |
| 1486063 | 4/1976 | United Kingdom ............. 350/96.23 |
| 2086607 | 4/1982 | United Kingdom . |
| 2122367 | 1/1984 | United Kingdom . |

OTHER PUBLICATIONS

Yamamoto et al., "Optical Fibre Jacketed with . . . ", Electronics Lett., vol. 19, No. 17, 8/83, pp. 674–675.
Pizzorno, "High Quality Optical Fibre Cable for Telecommunications", Conf. 27th Int. Wire and Cable Sym., Cherry Hill, N.J., 11/78, pp. 394–403.
Foord et al., "Principles of Fibre-Optical Cable Design", Pro. IEE, vol. 123, No. 6, Jun. 1976, pp. 597–602.
"Single-ended Fibre Strain and Length Measurement on Frequency Domain", by Kashyap and Reeve, Electronic Letters, vol. 16, No. 18, Aug. 1980.
"Temperature Densensitisation of Delay in Optical Fibres for Sensor Applications", by Kashyap et al., Electronic Letters, vol. 19, No. 24, Nov. 1983.

Primary Examiner—William L. Sikes
Assistant Examiner—Brian M. Healy
Attorney, Agent, or Firm—Nixon & Vanderhye

[57] ABSTRACT

A sheath for optical fibres comprises a compound sheath having an inner sheath (41) of high modulus and density, and an outer sheath layer (42) of low density material. The outer sheath layer may be of foamed polyethylene and the inner sheath of polypropylene, both conveniently formed by extrusion.

28 Claims, 2 Drawing Sheets

SHEATHED OPTICAL FIBER CABLE

BACKGROUND OF THE INVENTION

This invention relates to optical fibres and in particular sheathed optical fibres.

A method of installing optical fibre transmission lines is disclosed in European patent application No. 83306636.8 (Title: Optical Fibre Transmission Lines, Applicants: British Telecommunications, Inventors: M. H. Reeve and S. A. Cassidy and corresponding to U.S. Pat. No. 4,691,896), which utilizes the drag forces generated by gas flow to propel optical fibre transmission lines through tubular installation pathways, for insertion or withdrawal of such lines. The optical fibre transmission lines usually comprise optical fibre members in which one or more optical fibres are enclosed in a common jacket.

SUMMARY OF THE INVENTION

It is an object of the present invention to provide optical fibre members especially suited for use with the aforesaid method of installation.

According to the present invention, an optical fibre member includes a sheath comprising an inner sheath containing a plurality of optical fibres, and an outer sheath containing the inner sheath, wherein the inner sheath comprises material of a first elasticity modulus, wherein the outer sheath comprises material having a second elasticity modulus and low density and wherein the first modulus is high as compared to the second modulus.

The outer sheath is conveniently directly adhered to the inner sheath.

The inner sheath may be in the form of a matrix of sheathing material containing the fibre or fibres. Alternatively, the inner sheath may comprise a sleeve surrounding the fibre or fibres.

The inner sheath may comprise a coating applied to the optical fibres. Alternatively, the inner sheath may be formed by extrusion about the fibres.

The outer sheath layer is conveniently formed by extrusion about the inner sheath.

The outer sheath suitably comprises cellular material of low density and is preferably of a substantially greater cross-sectional area than the inner sheath.

The material of the outer sheath preferably has an elasticity modulus of between $10^7$ and $10^8$ $Nm^{-2}$.

In a preferred form of the present invention the sheath comprises an inner sheath in the form of a thin annular sleeve of relatively high density polymer, and an annular outer sheath enclosing the inner sheath and formed of relatively low density foamed polymer. Where the sleeve contains a plurality of optical fibres, the sleeve conveniently fits sufficiently tightly for the enclosed optical fibres to be closely packed.

While conventionally constructed fibre members have been used sucessfully for installation by the technique disclosed in European patent application No. 83306636.8, the applicants have found that by employing fibre members according to the present invention improvements such as, for example, greater continuous installation lengths, reduced likelihood of damage to the optical fibre or fibres, etc, can be achieved.

BRIEF DESCRIPTION OF THE DRAWINGS

The invention will now be described further by way of example only and with reference to the accompanying drawings, in which.

DETAILED DESCRIPTION OF THE PREFERRED EMBODIMENTS

Figure 1:
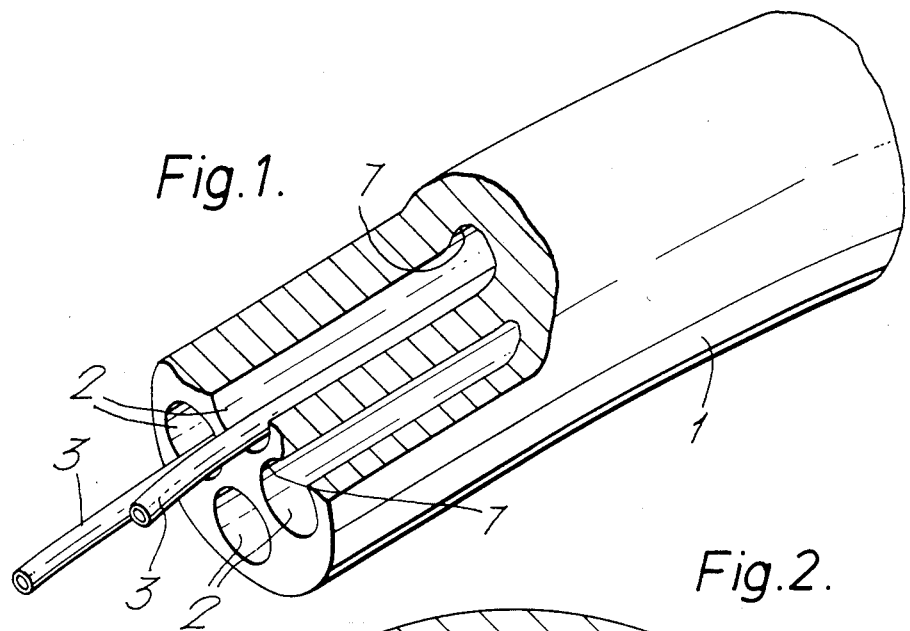
FIG. 1 is a schematic cut-away drawing of a conduit such as may be used with the method of European patent application No. 833306636.8, and optical fibre members of the kind provided in accordance with the present invention located therein.
Figure 2:
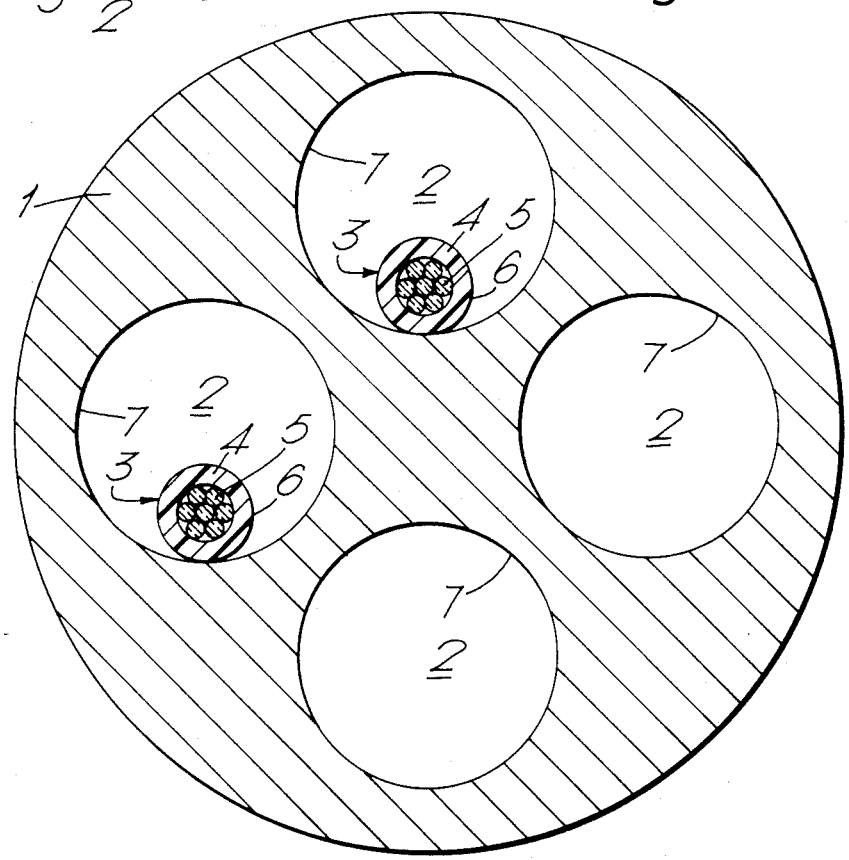
FIG. 2 is an enlarged cross-section of the conduit and optical fibre members of FIG. 1.

Referring first to FIGS. 1 and 2, a conduit 1 comprises one or more tubular pathways 2 and carries a plurality of optical fibre transmission lines provided by optical fibre members 3. The structure shown in FIGS. 1 and 2 enable insertion and/or withdrawal of the optical fibre members 3 by the method of European patent application No. 83306636.8, that is to say, by passing a gas, usually air, through the pathways 2. The drag forces on the fibre members 3 generated by the passage of the gas propel the optical fibre members 3 through the pathways 2.

Figure 3:
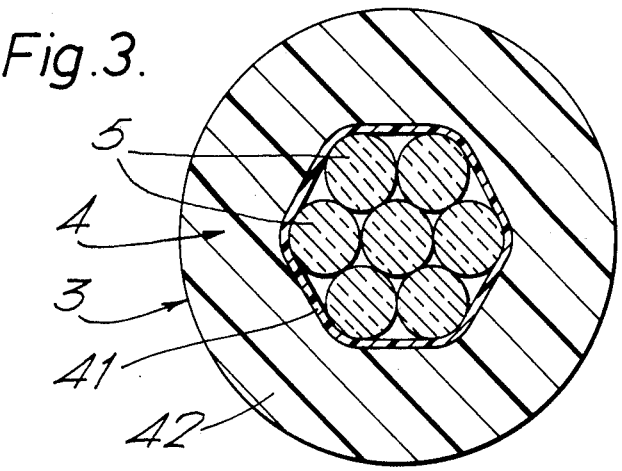
FIG. 3 shows a further enlarged cross-section of the optical fibre member of FIG. 2.

Referring now also to FIG. 3, the optical fibre members 3 comprise, in this instance, seven optical fibres 5 enclosed in a common sheath 4. The sheath 4 comprises an inner sheath 41 sufficiently tightly surrounding the optical fibres 5 for the fibres 5 to be closely packed, and an outer sheath 42 surrounding the inner sheath 41.

The inner sheath is formed of relatively high density material having a relatively high modulus of elasticity, while the outer sheath layer 42 is formed from cellular, relatively low density material having a relatively low modulus of elasticity.

More specifically, a fibre member as shown in FIG. 3 was manufactured as follows, using as outer sheath material a cellular polymer which is light and flexible.

Optical fibres 5 having an approximate overall outside diameter, including a protective coating of ultra violet light-cured acrylate, of 0.25 mm each, were enclosed in a sheath 4 comprising a thin inner sheath layer 41 and a thick outer sheath layer 42. The inner sheath 41 had a thickness of between 0.1 and 0.2 mm, and the outside diameter of the outer sheath 42 was of the order of 2 mm. The inner sheath 41 was formed from polypropylene, and the outer sheath 42 from foamed polyethylene. The material for the outer sheath 42 was obtained from BXL Ltd., of Grangemouth Works, Inchyra Road Grangemouth, Stirlingshire, United Kingdom, product number DFDK 4960. The sheaths 41 and 42 were applied to the form of a coating by successive extrusion, with the inner sheath 41 extruded first about the optical fibres 5 followed by extrusion of the outer sheath 42 about the inner sheath.

The extrusion may be performed in successive extrusion heads of a single extrusion path.

It may further be advantageous to coat the fibres 5 with an ultraviolet light curable coating material prior to extruding the inner sheath, and to cure the coating material at some time after extrusion.

It is important that throughout the range of operating temperatures, the modulus and shrinkage of the sheath are such that the resulting compressive force on the fibre is insufficient to cause buckling of the fibre.

The following theoretical model is intended to provide some guidance to selecting appropriate sheath parameters. The calculations are based on an optical fibre having a modulus $E = 7.3 \times 10^{10} Nm^{-2}$ and moment of area $I = 1.2 \times 10^{-17} m^4$ The case of a single fibre enclosed in a sheath in the form of a coating will be treated first, in which the the layer forming the outer sheath has a modulus of $\alpha = 4 \times 10^7 Nm^{-2}$, and the layer forming the thin inner sheath has a modulus of about $10^9 Nm^{-2}$.

Using a standard result from the field of elastic stability, the compressive force $T_c$ necessary to cause sudden buckling of the fibre is given by $$T_c = EI\pi^2 n^2/l^2 + \alpha l^2/\pi^2 n^2$$

where n is the integer which minimises $T_c$.

$\pi n/l$ corresponds to the wavenumber, k, of this buckling. This can be thought of as continuous if n is large (i.e. $n/l \approx (n+1)/l$). Therefore T can be found to have a minimum at $k = \sqrt[4]{\alpha/EI}$, which gives $T_c$ for one fibre = 12N, and the corresponding buckling wavelength 2.4 mm. A 9.5% strain in the foamed sheath 42 would be sufficient to buckle a perfectly straight fibre in a perfectly concentric coating. In practice the critical force is appreciably lower because the package is neither perfectly straight nor concentric, and the transverse modulus is in practice also much lower than the value adopted here for the purposes of calculation since the foam has finite thickness, and so is able to bend as well as deform. Nevertheless, the calculated figures are considered to permit useful comparison and to provide an acceptable order of magnitude estimate of the critical buckling forces.

Within an order of magnitude these forces are present due to the foam shrinkage, and a single fibre so coated was found to buckle.

If bending of an assembly of seven fibres is treated as behaving like seven independent fibres, I is increased by a factor of 7, giving $$T_c = 31.4N$$

implying a coating strain of 25°/0.

If, however, the seven fibres are locked together and bend as a single entity, then $EI \approx 10^{-4}$, and $$T_c = 126N$$

which is well over an order of magnitude larger than the forces available, and so the fibres are extremely unlikely to buckle.

There is therefore an advantage in locking the fibres together into a fixed matrix, even though in practice there will probably be a small slippage between the fibres.

During one sheathing process, one fibre was monitored for strain using the single ended frequency domain technique described in R Kashyap, M H reeve, "Single ended fibre strain and length measurement in frequency domain" Electronics Letters Vol 16 No. 18 Aug. 1980. The strain on the fibre was found to be compressive, and of magnitude 0.034°/0. This implies that the foam is under a strain of about 1.6°/0, which confirms the above assumptions about the order of magnitude of the compressive forces on the fibres.

The fibre member was installed, by the method of European patent application No. 833306636.8, into a test route consisting of 100 m flexible conduit providing a tubular pathway of 6 mm bore diameter, the conduit having been wound onto a drum of 0.5 m diameter. The installation required 30 psi of air pressure.

The fibre member described here with reference to FIG. 3 with seven fibres has been found to be not only suitable for installation by the technique of European patent application No. 833306636.8, but also to provide good loss and temperature performance.

Figure 4:
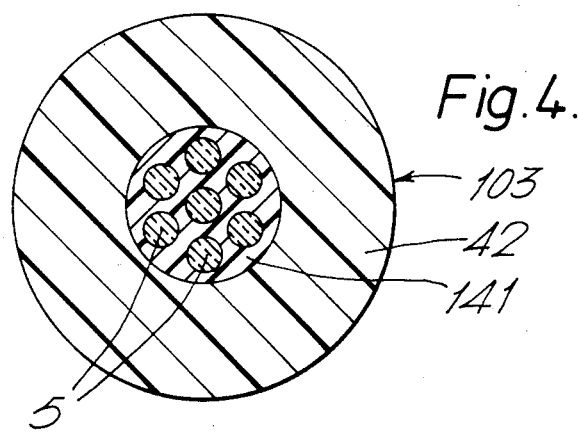
FIGS. 4 shows an enlarged cross-section of a further optical fibre member according to the present invention.

FIG. 4 is a cross-section of a fibre member 103 which differs from that of FIG. 3 in that the inner sheath does not take the form of the thin layer 41—instead, the fibres 5 are coated when pristine with a coating 141 which forms a matrix in which the fibres are embedded. In this manner good adhesion is provided between the optical fibres 5 as well as a suitable surface onto which to extrude the outer sheath 42. Thus, the inner sheath 141 of the optical fibre member 103 is now provided by the coating 141 in which the topical fibres 5 are embedded.

In order to reduce stress on individual fibres caused by contraction of the sheath, for example after completion of insertion by the method of European patent application No. 83306636.8, or on account of temperature variations, the inner sheath 41, 141 is in intimate contact with the optical fibres 5, utilizing the combined high compression modulus of all the fibres 5. In the fibre member of FIG. 3 the radial compression by the inner sheath 41 causes sufficient frictional contact between the fibres 5 to ensure combined resistance to longitudinal compression, while in the case of the embodiment of FIG. 4 this is achieved by embedding the fibres 5 in the inner sheath 141.

In order to avoid placing any appreciable strain on the fibres, the moduli of the inner sheath 41, 141 and the outer sheath layer 42 may be chosen such that the overall expansion coefficient of the whole sheath is practically negligible or matched to the fibre expansion coefficient. This may be achieved, for example, by forming the inner sheath 41 of a material having a negative temperature coefficient, eg an orientated polymer such as a thermotropic liquid crystal polyester having the properties described in "Temperature desensitisation of delay in optical fibres for sensor applications", S. Hornung et al, Electronics Letters, Nov. 24, 1983, Volumes 19, No. 24, pp. 1039–1040.

The material for the outer sheath layer 42 may advantageously be chosen to accept antistatic agents, antifriction agents and the like, to lessen static adhesion and friction respectively between the sheath and the wall of the tubular pathway during insertion.

I claim:

1. An optical fibre member including a sheath comprising:
    an inner sheath containing and holding a plurality of optical fibres into a locked-together unitary matrix thereby providing enhanced buckling resistance, and
    an outer sheath containing the inner sheath,
    wherein the inner sheath comprises material of a first elasticity modulus and the outer sheath comprises material having a second elasticity modulus and low density compared to the density of the inner sheath, and wherein the first modulus is high as compared to the second modulus.

2. An optical fibre member as claimed in claim 1, wherein the outer sheath is directly adhered to the inner sheath.

3. An optical fibre member as claimed in claim 1 or claim 2, wherein the inner sheath is in the form of a matrix of sheathing material surrounding the fibres.

4. An optical fibre member as claimed in claim 1 or claim 2, wherein the inner sheath comprises a sleeve surrounding the fibres.

5. An optical fibre member as claimed in claim 1 or 2 wherein the inner sheath forms a tightly fitting envelope to the fibre or fibres.

6. An optical fibre member as claimed in claim 3, wherein the inner sheath comprises a coating applied to the optical fibres.

7. An optical fibre member as in claim 1 or 2, wherein the outer sheath is formed by extrusion about the inner sheath.

8. An optical fibre member as in claim 1 or 2, wherein the outer sheath is formed by extrusion about the inner sheath.

9. An optical fibre member as in claim 1 or 2, wherein the outer sheath comprises cellular material of low density.

10. An optical fibre member as in claim 1 or 2, wherein the outer sheath is of a substantially greater cross-sectional area than the inner sheath.

11. An optical fibre member as in claim 1 or 2, wherein the material of the outer sheath has an elasticity modulus of between $10^7$ and $10^8 Nm^{-2}$.

12. An optical fibre member as claimed in claim 11 wherein said modulus is α of the order of $5 \times 10^7 Nm^{-2}$.

13. An optical fibre member as claimed in claim 1 or 2, wherein the outer sheath layer comprises foamed polyethylene.

14. An optical fibre member as claimed in claim 1 or 2, wherein the inner sheath has a modulus of the order of $10^9 Nm^{-2}$.

15. An optical fibre member as claimed in claim 14 in which the inner sheath is formed of polypropylene.

16. An optical fibre member including a sheath, wherein the sheath comprises:
an inner sheath in the form of a thin annular sleeve of relatively high density polymer, and
an annular outer sheath enclosing the inner sheath and formed of relatively low density foamed polymer;
wherein the inner sheath contains a plurality of optical fibres and fits sufficiently tightly for the enclosed optical fibres to be placed under radial compression.

17. An optical fibre structure particularly suited for blown-fibre installation within an elongated conduit using drag forces generated by a relatively moving gas flow within the conduit, said optical fibre structure comprising:
a plurality of optical fibres;
a first sheath means surrounding all of said optical fibres and tightly locking them together along substantially their entire length so as to force the plural fibres, if bent or buckled, to bend or buckle together as a single entity thus substantially increasing the compressive force required to cause such bending or buckling;
said first sheath means being formed of a first material having a first modulus of elasticity, having a first density and extending a first radial extension distance beyond the edge of the outermost fibers in said plurality of fibres; and
a second sheath means surrounding said first sheath means and extending a second radial extension distance beyond the outer edge of the inner sheath means, said second radial extension distance being substantially greater than said first radial extension distance;
said second sheath means being formed of a second material having a second modulus of elasticity substantially less than said first modulus and having a second density substantially less than said first density;
thereby providing a light weight optical fibre structure which is resistant to buckling forces and which presents an outer surface of increased area and drag resistance to a relatively moving gas flow, which structure is particularly suited for blown-fibre installation within an elongated conduit.

18. An optical fibre structure as in claim 17 wherein each of said optical fibres has a modulus E on the order of $10^{10} Nm^{-2}$.

19. An optical fibre structure as in claim 17 or 18 wherein the modulus E of said optical fibres is substantially greater than the modulus E of said first and second sheath means and of any other element included in said structure.

20. An optical fibre structure as in claim 17 wherein said first and second sheath means are formed by successive extrusion about said fibres.

21. An optical fibre structure as in claim 17, 18 or 20 wherein said first sheath means comprises a polymer.

22. An optical fibre structure as in claim 21 wherein said first sheath means comprises polypropylene and said second sheath means comprises formed polyethylene.

23. An optical fibre structure as in claim 17, 18 or 20 wherein said first sheath means extends radially inwardly between said fibres.

24. An optical fibre structure as in claim 22 wherein said first sheath means extends radially inwardly between said fibres.

25. An optical fibre structure as in claim 17, 18 or 20 wherein said fibres are closely packed together in mutually touching relationship and said first sheath means includes a thin layer circumscribing the fibre bundle and exerting a force directed radially inwardly thereon to maintain the fibres in a close packed configuration.

26. An optical fibre structure as in claim 24 wherein said first sheath means comprises a polymer.

27. An optical fibre structure as in claim 25 wherein said first sheath means comprises polypropylene and said second sheath means comprises foamed polyethylene.

28. An optical fibre structure comprising:
a plurality of mutually touching, close-packed optical fibres, foaming a central bundle in cross-section;
an inner sheath means surrounding said optical fibres and locking them together in said close-packed configuration along substantially their entire length; and
a lower-density, lower-modulus of elasticity, outer sheath means surrounding said inner sheath means and providing a relatively bulky, high-drag, lightweight optical fibre structure suitable for blown-fibre installation into an elongated conduit, said optical fibres having a modulus E substantially greater than any other element included as part of said structure.

* * * * *